United States Patent
Uchida et al.

(10) Patent No.: US 8,213,534 B2
(45) Date of Patent: Jul. 3, 2012

(54) TRANSMISSION APPARATUS AND COMMUNICATION SYSTEM

(75) Inventors: Shigenori Uchida, Kanagawa (JP); Norihito Mihota, Saitama (JP); Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 295 days.

(21) Appl. No.: 12/731,425

(22) Filed: Mar. 25, 2010

(65) Prior Publication Data
US 2010/0254477 A1 Oct. 7, 2010

(30) Foreign Application Priority Data
Apr. 7, 2009 (JP) ................................. 2009-093444

(51) Int. Cl.
*H04L 27/00* (2006.01)
(52) U.S. Cl. ........ 375/295; 375/279; 375/308; 333/113; 333/137; 333/157; 333/208
(58) Field of Classification Search .................. 375/295, 375/279, 308; 333/113, 137, 157, 208
See application file for complete search history.

(56) References Cited

U.S. PATENT DOCUMENTS

| | | | |
|---|---|---|---|
| 6,430,322 B1 * | 8/2002 | Al-hemyari | 385/3 |
| 2006/0145784 A1 * | 7/2006 | Dean | 333/161 |
| 2006/0269285 A1 * | 11/2006 | Farmer et al. | 398/72 |

FOREIGN PATENT DOCUMENTS

| | | |
|---|---|---|
| DE | 2459045 | 4/1976 |
| JP | 10-070582 | 3/1998 |
| JP | 10070582 | 3/1998 |
| JP | 2007-150646 | 6/2007 |

OTHER PUBLICATIONS

European Search Report corresponding to European Serial No. 10002629.3 dated Aug. 5, 2010.

* cited by examiner

*Primary Examiner* — Ted M. Wang
(74) *Attorney, Agent, or Firm* — SNR Denton US LLP

(57) ABSTRACT

Disclosed herein is a transmission apparatus including a first transmission block configured to modulate a carrier-wave signal having a predetermined frequency on the basis of a first input signal, thereby outputting a first transmission signal; and a second transmission block configured to modulate a carrier-wave signal having a predetermined frequency on the basis of a second input signal, thereby outputting a second transmission signal; wherein a first input point for inputting the first transmission signal outputted from the first transmission block into a waveguide and a second input point for inputting the second transmission signal outputted from the second transmission block into the waveguide are shifted by a distance for providing a predetermined phase difference between the first transmission signal and the second transmission signal.

15 Claims, 15 Drawing Sheets

FREQUENCY OF SIGNAL
OBSERVED BY FREQUENCY
ANALYSIS BLOCK 280

FREQUENCY OF SIGNAL
OBSERVED BY TRANSMISSION-SIDE
CONNECTION BLOCK 218

| QPSK | |
|---|---|
| BIT | PHASE $\theta$ |
| 0,0 | $\pi/4$ |
| 0,1 | $3\pi/4$ |
| 1,0 | $-\pi/4$ |
| 1,1 | $-3\pi/4$ |

TRANSMISSION APPARATUS AND COMMUNICATION SYSTEM

BACKGROUND OF THE INVENTION

1. Field of the Invention

The present invention relates to a transmission apparatus and a communication system. To be more particular, embodiments of the present invention are intended to realize high-speed transmission based on IQ quadrature axis by shifting a first input point for inputting a first transmission signal into a waveguide and a second input point for inputting a second transmission signal into the waveguide by a distance that gives a predetermined phase difference between the first transmission signal and the second transmission signal.

2. Description of the Related Art

These days, researches into high-speed transmission technologies based on high-frequency bands such as millimeter waves have been vigorously under way in order to attain low power dissipating and low cost signal transmission based on small circuit scales using CMOS (Complementary Metal Oxide Semiconductor) technologies. This is because it is possible to realize this signal transmission by configuring digital circuit module and a millimeter wave RF front-end module with a single chip by use of CMOS processes suitable for mass production. Related-art high-speed baseband signal transmission apparatuses are each configured by a board low in dielectric loss, a first part and a second part installed on this board, and a waveguide providing connection between these first and second parts. By reducing the interference between these first and second parts on the board, the high-speed signal transmission between these first and second parts on the board is realized.

It should be noted here that, in the above-mentioned high-speed baseband signal transmission apparatus and so on, a phase modulation scheme based on the quadrature IQ axis has been in wide use in order to achieve faster transmission rates. In phase modulation, the phase of carrier wave is discretely changed in accordance with a digital code in digital transmission for example, executing digital code mapping for phase component θ given by equation (1) below.

$$S(t)=A(t)\cos(2\pi fc+\theta(t)) \quad (1)$$

In the equation above, A(t) denotes amplitude and θ(t) denotes phase.

In the case of QPSK (Quadrature Phase Shift Keying) modulation that is one of phase modulation schemes, for example, QPSK modulation can be realized by expressing a 2-bit digital code by one phase. FIG. 16 shows an example of mapping of digital code and phase θ. FIG. 17 shows how each digital code is mapped on a complex baseband signal. Thus, a technology for enhancing high-speed transmission by imposing multi-bit information on one piece of phase information has been used for long. Other multi-bit transmission technologies include QAM (Quadrature Amplitude Modulation) transmission for example that uses both amplitude and phase is popular these days.

However, the execution of these transmission schemes desires a 90-degree phase shifter or the like for orthogonalizing I-axis and Q-axis on a complex plane, for example, and, when multi-bit transmission is attempted, this orthogonalization has to be realized with a high precision. Hence, a variety of accuracy compensation methods have been proposed so far.

For example, Japanese Patent Laid-open No. Hei 10-70582 (page 5, FIG. 1), which is hereinafter referred to as Patent Document 1, discloses a transmitting device having a compensating circuit configured, in consideration of the accuracy of an quadrature modulating circuit, to suppress a carrier wave leak below a desired value by increasing or decreasing a direct current bias so that a voltage detected by a wave detector goes below a predetermined level.

Japanese Patent Laid-open No. 2007-150646 (page 8, FIG. 4), which is hereinafter referred to as Patent Document 2, discloses a wireless communication apparatus configured to switch to the BPSK (Binary Phase Shift Keying) scheme if the accuracy is poor and IQ orthogonality is unnecessary and switch to the QPSK scheme if the accuracy is good, thereby assuring the maintenance of the transmission channel rather than the maintenance of IQ quadrature accuracy.

SUMMARY OF THE INVENTION

However, the inventions disclosed in the above-mentioned Patent Documents 1 and 2 involve the following problems if the high-speed transmission based on IQ quadrature axis is achieved by using a 90-degree phase shift or the like. To be more specific, the invention disclosed in Patent Document 1 desires the installation of a compensating circuit including a computation block, a wave detection block and so on in addition to a transmission path including a signal modulation block, a signal mixer and so on that is inherent to the transmitter. This prevents the circuit scale of the transmitter from being made smaller in size, which leads to an increased cost. With the invention disclosed in the Patent Document 2, it is obvious that the transfer rate drops at application of BPSK modulation, so that stable high-speed transmission may not be expected.

Therefore, the embodiments of the present invention addresses the above-identified and other problems associated with related-art methods and apparatuses and solves the addressed problems by providing a transmission apparatus using a waveguide and a communication system composed thereof configured to realize precision and high-speed transmission while achieving circuit simplification by removing the use of the 90-degree phase shifter for orthogonalizing I-axis and Q-axis, the quadrature oscillator, and so on.

In carrying out the invention and according to one mode thereof, there is provided a transmission apparatus. This transmission apparatus has a first transmission block configured to modulate a carrier-wave signal having a predetermined frequency on the basis of a first input signal, thereby outputting a first transmission signal and a second transmission block configured to modulate a carrier-wave signal having a predetermined frequency on the basis of a second input signal, thereby outputting a second transmission signal. In this transmission apparatus, a first input point for inputting the first transmission signal outputted from the first transmission block into a waveguide and a second input point for inputting the second transmission signal outputted from the second transmission block into the waveguide are shifted by a distance for providing a predetermined phase difference between the first transmission signal and the second transmission signal.

In carrying out the invention and according to another mode thereof, there is provided a communication system. This communication system has a transmission apparatus having a first transmission block configured to modulate a carrier-wave signal having a predetermined frequency on the basis of a first input signal, thereby outputting a first transmission signal and a second transmission block configured to modulate a carrier-wave signal having a predetermined frequency on the basis of a input second signal, thereby outputting a second transmission signal; a waveguide in which the first transmission signal outputted from the first transmission block and the second transmission signal outputted from the second transmission block are inputted; and a reception apparatus configured to receive the first transmission signal and the second transmission signal transmitted via the waveguide and demodulate the received first transmission signal and the received second transmission signal to obtain reception signals on the basis of a carrier-wave signal having a predetermined frequency. In this communication system, a first input point for inputting the first transmission signal outputted from the first transmission block into a waveguide and a second input point for inputting the second transmission signal outputted from the second transmission block into the waveguide are shifted by a distance for providing a predetermined phase difference between the first transmission signal and the second transmission signal.

In embodiments of the present invention, a carrier-wave signal having a predetermined frequency is modulated by a first transmission block on the basis of a first input signal and outputted as a first transmission signal. A carrier-wave signal having a predetermined frequency is modulated by a second transmission block on the basis of a second input signal and outputted as a second transmission signal. Modulation schemes include phase modulation and amplitude modulation, for example; to be more specific, BPSK, QPSK, 8-phase PSK, QAM, and so on.

The signal-processed first transmission signal is inputted in the waveguide via the first input point and the signal-processed second transmission signal is inputted in the waveguide via the second input point. In embodiments of the present invention, the first input point and the second input point are shifted from each other by a distance that provides a predetermined phase difference between the first transmission signal and the second transmission signal. Hence, for example, if the distance between the first input point and the second input point is shifted by (¼+N)λ wavelength, the phase difference between the first transmission signal and the second transmission signal can be controlled to 90 degrees. As a result, high-speed transmission can be realized by use of IQ quadrature axis. Here, N denotes an integer and λ denotes a wavelength of carrier-wave signal. In addition, the precision IQ quadrature axis can be realized without use of complicated systems, so that high-order modulation schemes such as multi-level modulation schemes for example can be realized.

As described and according to embodiments of the present invention, a waveguide is arranged in a state where a first input point and a second input point are shifted from each other by a distance that provides a phase difference between a first transmission signal and a second transmission signal. This novel configuration can realizes IQ quadrature transmission without using a quadrature oscillator and a 90-degree phase shifter. As a result, the circuit scale and cost of the transmission apparatus can be significantly reduced.

DETAILED DESCRIPTION OF THE PREFERRED EMBODIMENTS

This invention will be described in further detail by way of embodiments thereof with reference to the accompanying drawings. The description will be made in the following order:

(1) The first embodiment (an example of realizing IQ quadrature axis in a high-frequency transmission system)
(2) A variation to the first embodiment
(3) The second embodiment (an example of calibration by an antenna member)
(4) A variation to the second embodiment
(5) The third embodiment (an example of calibration of amplitude)
(6) The fourth embodiment (an example of calibration by use of a liquid crystal layer)
(7) The fifth embodiment (an example of calibration by use of a delay element)
(8) The sixth embodiment (an example of calibration by use of a phase element)
(9) The seventh embodiment (an example of calibration by cooperation between a transmission apparatus and a reception apparatus)

(10) The eighth embodiment (an example of calibration by cooperation between a transmission apparatus and a reception apparatus)

(1) The First Embodiment

Figure 1:
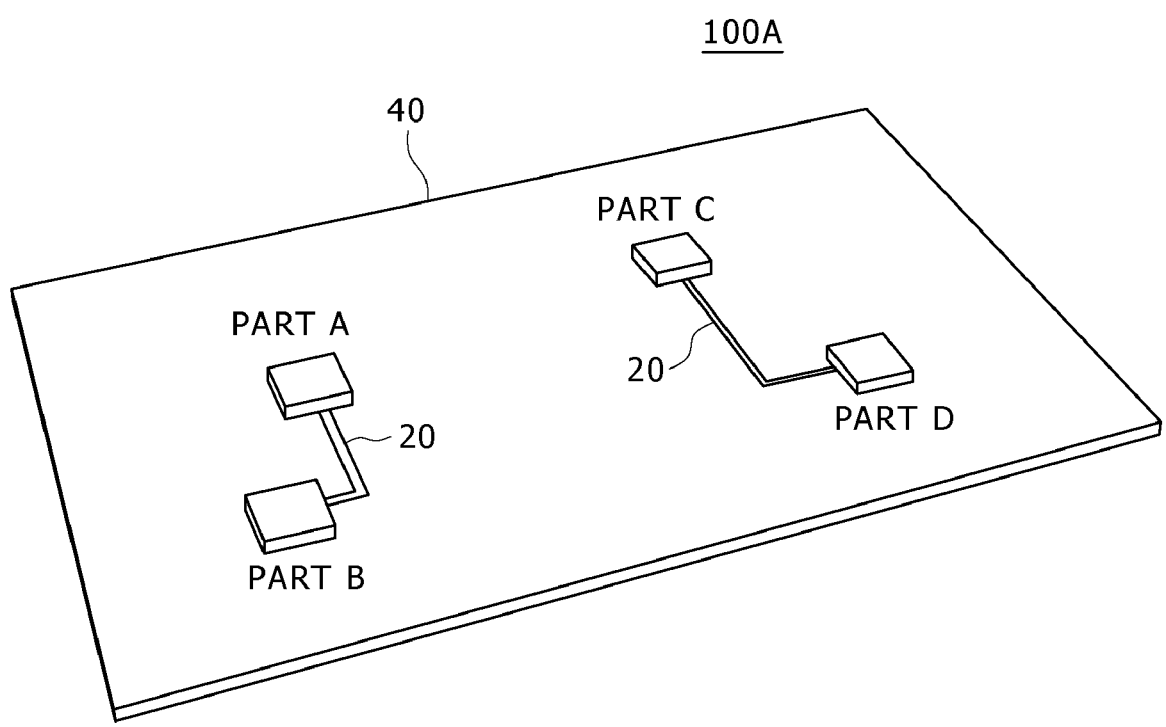
FIG. 1 is a view of an exemplary configuration of a high-frequency transmission system practiced as a first embodiment of the invention.

Exemplary configuration of a high-frequency transmission system:

As shown in FIG. 1, a high-frequency transmission system 100A associated with the embodiments of the present invention is one exemplary communication system that is capable of the high-speed transmission of a millimeter-wave transmission signal of 30 GHz to 300 GHz, for example. This high-frequency transmission system 100A is configured by a part A, a part B, a part C, and a part D mounted on a substrate 40 and a waveguide 20 interconnecting the parts A, B, C, and D.

The parts A through D each incorporate a millimeter-wave transmission/reception module. In this example, the parts A and C are configured as a transmission apparatus and the parts B and D are configured as a reception apparatus. The part A and the part B are interconnected by the waveguide 20, in which high-speed signals, such as image signals and audio signals, are transmitted. The part C and the part D are interconnected by the waveguide 20, in which high-speed signals, such as image signals and audio signals, are transmitted. In what follows, the description will be made by use of an example of the signal transmission between the part A (a transmission apparatus 200) and the part B (a reception apparatus 300).

Figure 2:
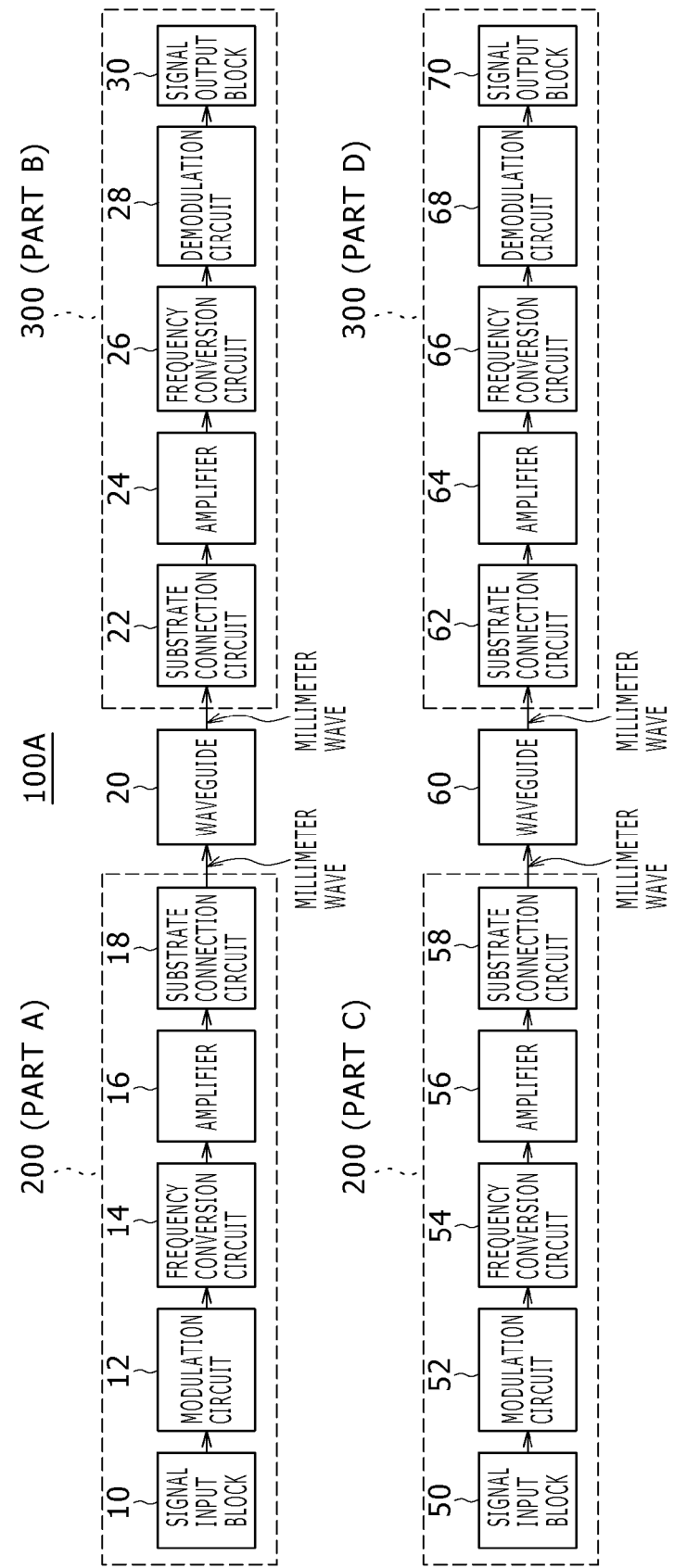
FIG. 2 is a diagram illustrating an exemplary block configuration of the high-frequency transmission system.

Exemplary block configuration of the high-frequency transmission system:

As shown in FIG. 2, the high-frequency transmission system 100A has the transmission apparatus 200, the reception apparatus 300, and the waveguide 20 for interconnecting these apparatuses. The transmission apparatus 200 has a signal input block 10, a modulation circuit 12, a frequency conversion circuit 14, an amplifier 16, and a connection circuit 18 for connecting the transmission apparatus 200 with a substrate. The reception apparatus 300 has a connection circuit 22 for connecting the reception apparatus 300 with the substrate, an amplifier 24, a frequency conversion block 26, a demodulation circuit 28, and a signal output block 30.

A predetermined signal generated in the transmission apparatus 200 is entered in the signal input block 10. The signal entered in the signal input block 10 is supplied to the modulation circuit 12. The modulation circuit 12 modulates the supplied signal and supplies the modulated signal to the frequency conversion circuit 14. The frequency conversion circuit 14 up-converts the supplied modulated signal to a desired frequency band (a millimeter wave) and supplies the up-converted signal to the amplifier 16. The amplifier 16 amplifies the up-converted signal and supplies the amplified signal to the connection circuit 18. The connection circuit 18 transmits the amplified signal to the reception apparatus 300 through the waveguide 20.

The connection circuit 22 of the reception apparatus 300 receives the signal transmitted from the transmission apparatus 200 side through the waveguide 20 and supplies the received signal to the amplifier 24. The amplifier 24 amplifies the received signal to compensate an attenuation thereof and supplies the amplified signal to the frequency conversion circuit 26. The frequency conversion circuit 26 down-converts the amplified signal and supplies the down-converted signal to the demodulation circuit 28. The demodulation circuit 28 demodulates the down-converted signal to get a baseband signal. Finally, the signal output block 30 outputs a data sequence based on the demodulated baseband signal, upon which the signal transmission from the transmission apparatus 200 to the reception apparatus 300 is completed. It should be noted that, if the transmission apparatus 200 and the reception apparatus 300 that execute communication are close to each other, the amplifier 16 and the amplifier 24 on the receiving side may be removed.

Exemplary circuit configuration of the high-frequency transmission system:

The following describes an exemplary circuit configuration of the above-mentioned high-frequency transmission system 100A. It should be noted that, with reference to FIG. 3, BPSK modulation blocks 212 and 213 correspond to the modulation circuit 12 shown in FIG. 12, a carrier-wave signal generation block 216 and mixers 214 and 215 correspond to the frequency conversion circuit 14 shown in FIG. 2, and input points 218 and 219 correspond to the connection circuit 18 shown in FIG. 2. Further, with reference to FIG. 3, an output point 258 corresponds to the connection circuit 22 shown in FIG. 2 and a QPSK demodulation block 250 corresponds to the demodulation circuit 28 shown in FIG. 2.

Figure 3:
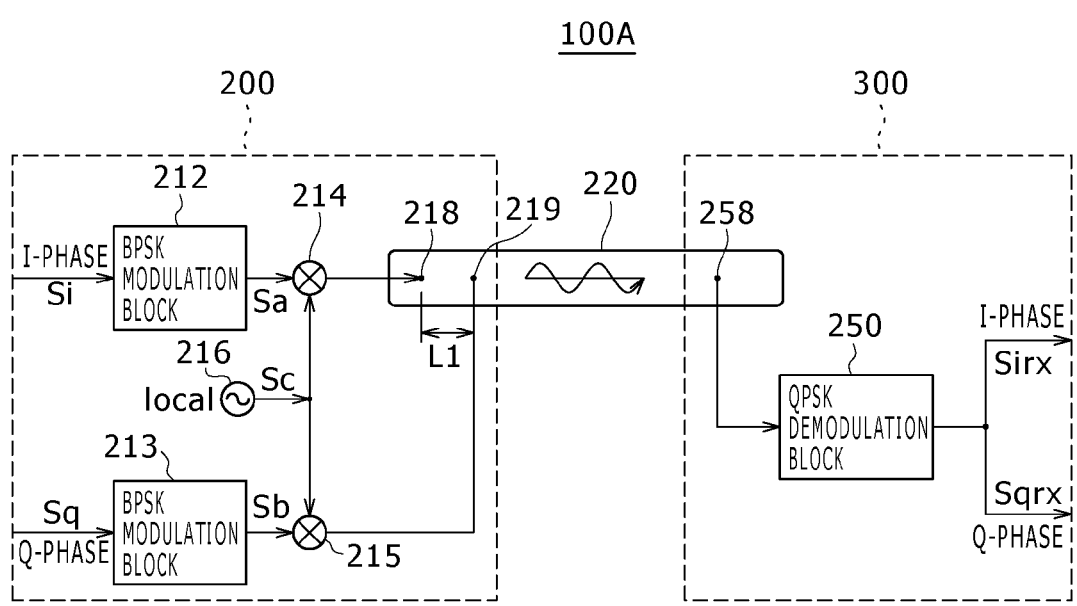
FIG. 3 is a diagram illustrating an exemplary circuit configuration of the high-frequency transmission system.

As shown in FIG. 3, signals to be transmitted to the reception apparatus 300 are allocated to I-phase and Q-phase. Baseband signal Si allocated to I-phase is supplied to the BPSK modulation block 212. The BPSK modulation block 212 generates modulation signal Sa by executing BPSK modulation (mapping) on this baseband signal in accordance with allocated bits and supplies the modulated signal Sa to the mixer 214. The carrier-wave signal generation block 216 generates carrier-wave signal Sc having a predetermined frequency and supplies the generated signal to the mixer 214. The mixer 214 multiplies modulation signal Sa generated by the BPSK modulation block 212 by carrier-wave signal Sc generated by the carrier-wave signal generation block 216 to frequency-convert (up-convert) modulation signal Sa, supplying frequency-converted modulation signal Sa to the input point 218. It should be noted that baseband signal Si is one example of a first signal and modulation signal Sa is one example of a first transmission signal. The input point 218 is one example of a first input point and the BPSK modulation block 212 and the mixer 214 are one example of a first transmission block.

Baseband signal Sq allocated to Q-phase is supplied to the BPSK modulation block 213. The BPSK modulation block 213 generates modulation signal Sb by executing BPSK modulation (mapping) on this baseband signal in accordance with allocated bits and supplies the modulated signal Sb to the mixer 215. The carrier-wave signal generation block 216 generates carrier-wave signal Sc having a predetermined frequency and supplies the generated signal to the mixer 215. The mixer 215 multiplies modulation signal Sb generated by the BPSK modulation block 213 by carrier-wave signal Sc to frequency-convert (up-convert) modulation signal Sb, supplying frequency-converted modulation signal Sb to the input point 219. It should be noted that baseband signal Sq is one example of a second signal and modulation signal Sb is one example of a second transmission signal. The input point 219 is one example of a second input point and the BPSK modulation block 213 and the mixer 215 are one example of a second transmission block.

The input points 218 and 219 are arranged at one end of the waveguide 220. The input point 218 and 219 each have a dipole antenna, loop antenna, or a small-size aperture connection element (or a slit antenna), for example. The input point 218 and 219 are shifted from each other by distance L1 that satisfies a relationship of equation (2) below for giving a predetermined phase difference between modulation signal Sa and modulation signal Sb in the carrier direction of the waveguide 220.

$$L1 = (1/4 + N)\lambda \qquad (2)$$

In equation (2) above, c of $\lambda = c/\sqrt{\in r f}$ denotes the speed in vacuum, f denotes the frequency of a carrier-wave signal, $\in r$ denotes a specific inductive capacity, and N denotes an integer.

Figure 4A:
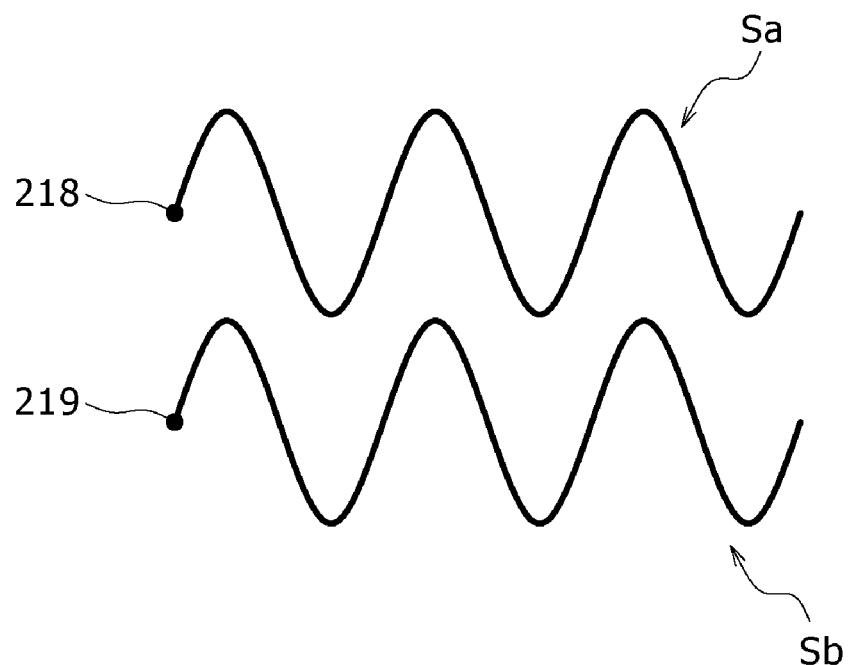
FIGS. 4A and 4B are diagrams illustrating exemplary phase relationships of modulation signals on a waveguide.
Figure 4B:
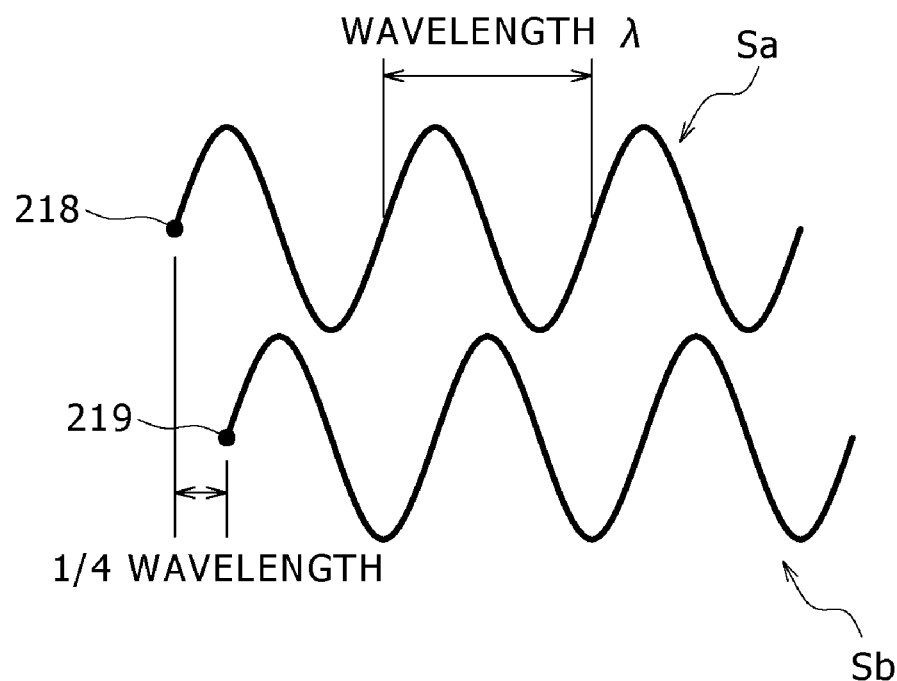

Consequently, as shown in FIG. 4B, modulation signal Sa transmitted from the input point 218 and modulation signal Sb transmitted from the input point 219 are shifted from each other at least 90 degrees on complex plane. Namely, shifting distance L1 between the input point 218 and the input point 219 by $(1/4+N)\lambda$ enables to orthogonalize the phases of modulation signals Sa and Sb without the use of a 90-degree phase shifter as practiced in related-art technologies. This state, when observed at one point (the output point 258) for example) on the waveguide 220, is equal to the relationship between sine wave and cosine wave, making it equivalent to a state in which a QPSK-modulated signal has arrived, so to speak. It should be noted that FIG. 4A shows a phase relationship between modulation signals Sa and Sb before phase shifting.

Returning to FIG. 3, the waveguide 220 has an elongated housing that partitioned by a conductive member and is mounted between the transmission apparatus 200 and the reception apparatus 300 mounted on the substrate 40. In the housing of the waveguide 220, a dielectric material having a predetermined specific inductive capacity, such as air or epoxy resin (the same material as the substrate 40), for example, is encapsulated. It should be noted that, for the substrate 40, a substrate having a relatively large transmission loss in millimeter band and therefore considered not suitable for millimeter wave transmission is used; namely, such a substrate covered with copper foils on both sides of the substrate with a glass epoxy resin used as insulation base having a dielectric tangent (tan $\delta$) of 0.01 or more.

The output point 258 is arranged on the other end of the waveguide 220 and has a dipole antenna, loop antenna, or a small-size aperture connection element (or a slit antenna), for example, as will be described later. The output point 258 receives modulation signals Sa and Sb transmitted through the waveguide 220 and supplies the received signals to the QPSK demodulation block 250.

The QPSK demodulation block 250 executes QPSK modulation on the mutually orthogonal demodulation signals Sa and Sb received from the output point 258 to get baseband signal Sirx based on modulation signal Sa and baseband signal Sqrx based on modulation signal Sb.

As described above, in the present embodiment, the waveguide 220 is connected by setting distance L1 between the input points 218 and 219 to $(1/4+N)\lambda$. Consequently, the phase difference between the first modulation signal Sa and the second modulation signal Sb can be set to 90 degrees, thereby realizing IQ quadrature transmission without use of a quadrature oscillator or a 90-degree phase shifter. As a result, the circuit scale and the cost of the transmission apparatus 200 can be reduced. Further, use of the above-mentioned IQ quadrature axis in the high-frequency transmission system 100A using the waveguide 220 realizes high-speed transmission.

(2) A Variation to the First Embodiment

A variation to the first embodiment uses a reception apparatus 300 of a high-frequency transmission system 100B in a different configuration from that of the reception apparatus 300 of the high-frequency transmission system 100A described with reference to the above-mentioned first embodiment. It should be noted that components of this variation common to those of the above-mentioned high-frequency transmission system 100A of the first embodiment are denoted by the same reference codes and skipped in detail description.

Figure 5:
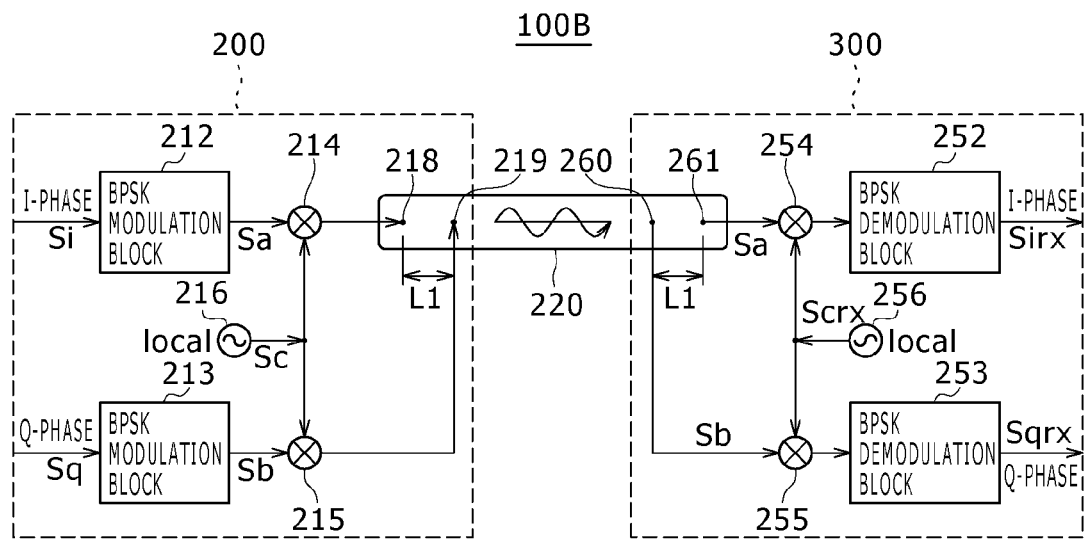
FIG. 5 is a diagram illustrating an exemplary configuration of a high-frequency transmission system associated with a variation to the first embodiment.

As shown in FIG. 5, the reception apparatus 300 has output points 260 and 261, mixers 254 and 255, and BPSK demodulation blocks 252 and 253. The output point 261 is arranged on one end of a waveguide 220. The output point 261 has a dipole antenna, for example. The output point 261 receives modulation signal Sa transmitted through the waveguide 220 and supplies the received signal to the mixer 254. A carrier wave signal generation block 256 generates carrier-wave signal Scrx and supplies the generated signal to the mixer 254. The mixer 254 multiplies modulation signal Sa by carrier-wave signal Scrx to frequency-convert (down-convert) modulation signal Sa, supplying resultant frequency-converted modulation signal Sa to the BPSK demodulation block 252. The BPSK demodulation block 252 demodulates (or maps) modulation signal Sa to obtain baseband signal Sirx.

The output point 260 is arranged on the other end of the waveguide 220 and has a dipole antenna for example. Also, the output point 260 is arranged at a position shifted from the output point 261 by distance L1 that satisfies the relationship of equation (2) above. Hence, modulation signal Sb transmitted through the waveguide 220 can be received with a shift from modulation signal Sb by $(1/4+N)\lambda$. Received modulation signal Sa is supplied to the mixer 255. The mixer 255 multiplies modulation signal Sb received through the waveguide 220 by carrier-wave signal Scrx to frequency-convert (down-convert) modulation signal Sb, supplying resultant frequency-converted modulation signal Sa to the BPSK demodulation block 253. The BPSK demodulation block 253 demodulates (or maps) modulation signal Sb to obtain baseband signal Sqrx.

As with the present variation, configuring the reception apparatus 300 like the transmission apparatus 200 can obtain substantially the same effects as those of the first embodiment mentioned above. For example, a phase difference between the first modulation signal Sa and the second modulation signal Sb can be set to 90 degrees to realize IQ quadrature transmission without use of a quadrature oscillator or a 90-degree phase shifter, consequently reducing the circuit scale and cost of the transmission apparatus 200.

(3) The Second Embodiment

An exemplary high-frequency transmission system having a phase calibration function:

With respect to the second embodiment of the invention, a high-frequency transmission system 100C having a calibration function of adjusting a phase difference between modulation signal Sa of I-phase and modulation signal Sb of Q-phase to 90 degrees is described. It should be noted that the high-frequency transmission system 100C is configured by adding this calibration function to the high-frequency transmission system 100A described above, so that the description of components and operations similar to those of the high-frequency transmission system 100A will be skipped.

Figure 6:
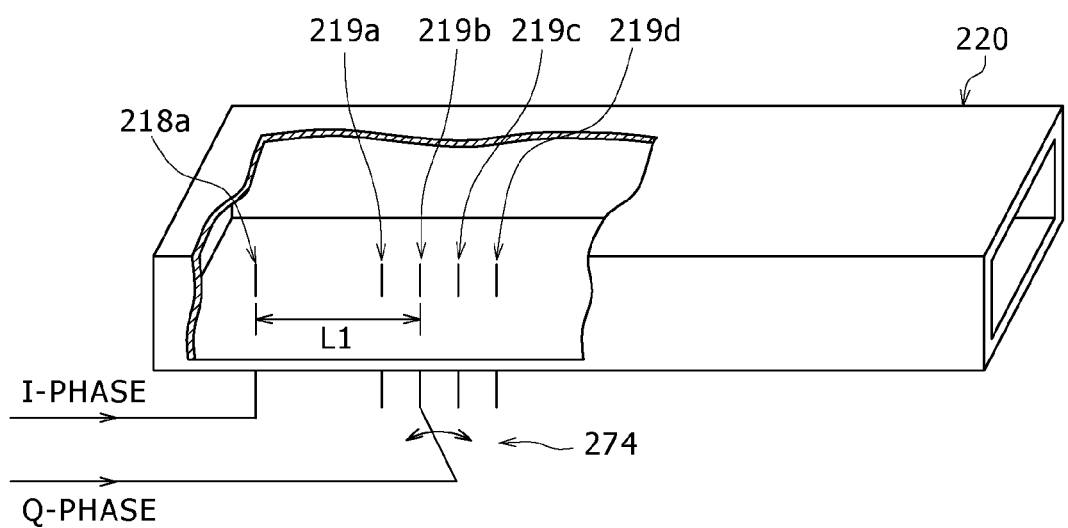
FIG. 6 is a view of an exemplary configuration of an antenna member of a high-frequency transmission system having a calibration function practiced as a second embodiment of the invention.
Figure 8:
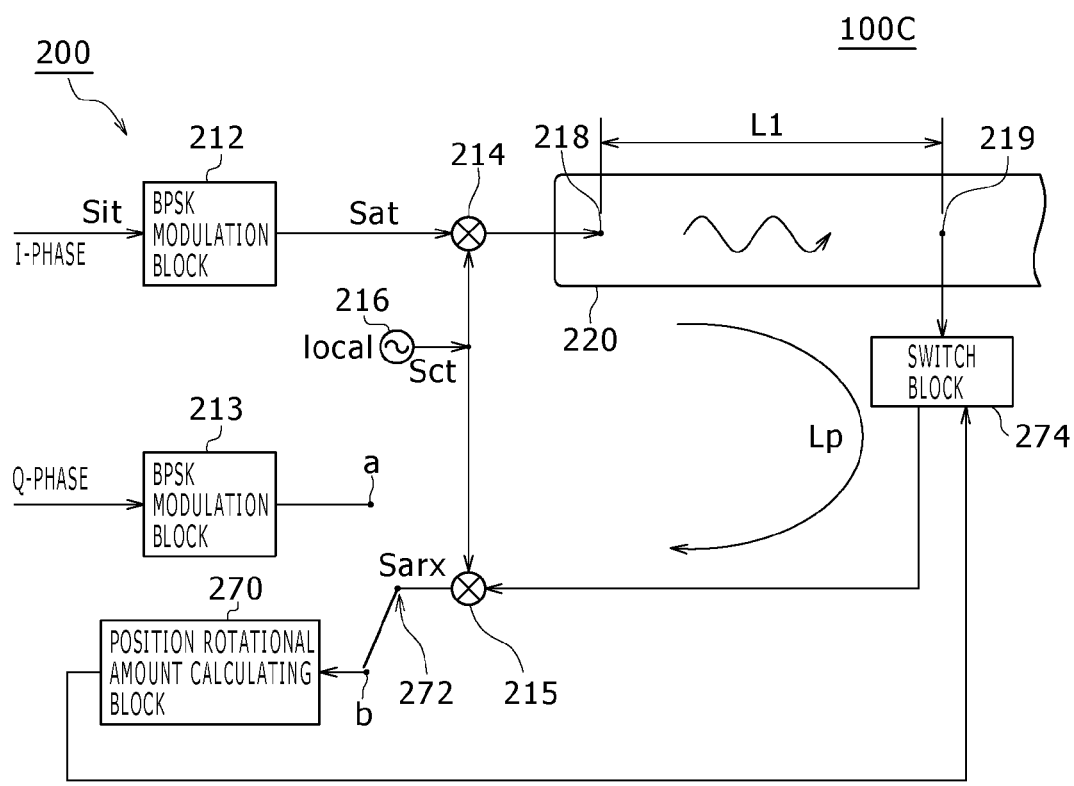
FIG. 8 is a diagram illustrating an exemplary configuration of the high-frequency transmission system having the calibration function.

Exemplary configuration of an antenna member:

First, an exemplary configuration of an antenna member of the high-frequency transmission system 100C having the calibration function is described. As shown in FIG. 6 and FIG. 8, an input point 218 of I-phase has an antenna member 218a of dipole type for example having a predetermined length based on wavelength $\lambda$ of a millimeter-wave signal for example. This antenna member 218a is connected to one end of a waveguide 220, thereby radiating modulation signal Sat for testing outputted from a mixer 254 into the waveguide 220.

The input point 219 of Q-phase has four antenna members 291a through 219d of dipole type for example having a predetermined length based on wavelength λ of a millimeter-wave signal for example. These antenna members are spaced from each other to be connected to one end of the waveguide 220. Any one of these antenna members 219a through 219d is electrically connected to a switch block 274 according to switching, receiving modulation signal Sat for testing radiated from the antenna member 218a in the calibration mode. It should be noted that, in the above-mentioned example, the antenna is configured by four antenna members 219a through 219d; it is also practicable to configure the antenna by two antenna members or five antenna members. As the number of antenna members increases, the finer the phase difference can be adjusted.

It should be noted here that, of the antenna members 219a through 219d, the antenna member 219b for example is connected at a position that is shifted from the antenna member 218a of I-phase by (¼+N)λ and other antenna members 219a, 219c, and 219d are connected at positions in the proximity of the antenna member 413. Positional (phase shift) information of the antenna member 219a through 219d is stored in a position rotational amount calculation block 270 to be described later. On the basis of a calculated shift and the positional information of the antenna members 219a through 219d, the optimum antenna members 219a to 219d can be selected.

Figure 7:
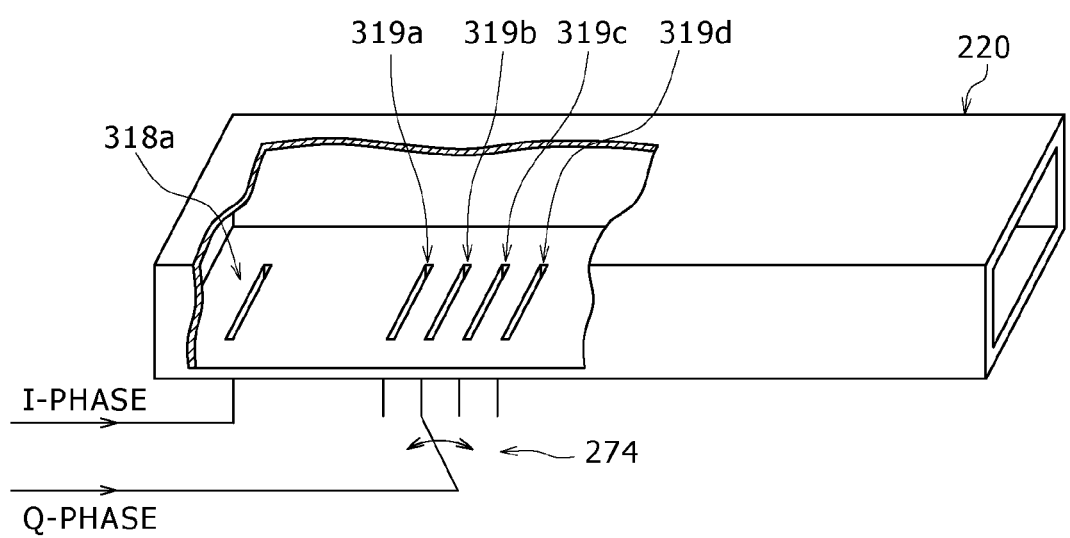
FIG. 7 is a view of a variation to the antenna member.

Another exemplary configuration of antenna members:

It should be noted that, in the above-mentioned example, the antenna members 218a through 218d are of dipole type; however, it is also practicable to use antenna members of slit type. As shown in FIG. 7, slit antenna 318a is formed on the bottom of one end of the waveguide 220 in the short direction thereof. The slit antennas 319a through 319d are formed on the bottom of one end of the waveguide 220 along the short direction with predetermined intervals between the antennas.

Any one of the slit antennas 319a through 319d (the slit antenna 319b for example) is formed at a position shifted from the slit antenna 318a by (¼+N)λ. The other slit antennas 319a, 319c, and 319d are formed at positions in the proximity of the slit antenna 319b. Such a configuration can also execute fine adjustment of the phase difference between modulation signal Sa and modulation signal Sb.

An exemplary configuration of the high-frequency transmission system:

The following describes the high-frequency transmission system 100C having antenna members 218a, 219a through 219d described above. The high-frequency transmission system 100C has a calibration mode for executing phase control and a communication mode for executing normal communication. The switching between these modes can be set by the user as desired or automatically set by a control block, not shown. When the calibration mode is set, the high-frequency transmission system 100C executes a calibration operation by forming loop Lp for receiving, at the input point 219, modulation signal Sat for testing transmitted from the input point 218 as shown in FIG. 8. Namely, only the transmission apparatus 200 side executes the calibration of phase.

The BPSK modulation block 212 of the I-phase side executes BPSK modulation in accordance with allocated baseband signal Sit for testing (bit) to generate modulation signal Sat for testing, which is supplied to the mixer 214. The carrier-wave signal generation block 216 generates carrier-wave signal Sct and supplies the generated signal to the mixer 214. The mixer 214 multiplies modulation signal Sat generated by the BPSK modulation block 212 by carrier-wave signal Sct to frequency-convert (up-convert) modulation signal Sat, supplying resultant frequency-converted modulation signal Sat to the input point 218. Modulation signal Sat supplied to the input point 218 is transmitted into the waveguide 220 via the antenna member.

Any one of the antenna members 219a through 219d arranged on the input point 219 also functions as an antenna member for receiving modulation signal Sat for testing in the calibration mode and receives modulation signal Sat transmitted from the input point 218, supplying the received signal to the mixer 215. It supposed here that distance L1 between the input point 218 and the input point 219 be set to (¼+N)λ as described above. The mixer 215 multiplies modulation signal Sat received at the antenna member of the input point 219 by carrier-wave signal Sct generated by the carrier-wave signal generation block 216 to frequency-convert (down-convert) modulation signal Sat, thereby obtaining reception signal Sarx. Frequency-converted reception signal Sarx is supplied to the position rotational amount calculation block 270 via the switch block 272. In the calibration mode, the switch block 272 is switched to the terminal b side by the position rotational amount calculation block 270 and a control block, not shown.

The position rotational amount calculation block 270 is one example of a control block and determines whether the phase difference between reception signal Sarx for testing outputted from the mixer 215 and reference signal St is 90 degrees (¼+N)λ. This is because the phase difference between the input point 218 and the input point 219 is set to (¼+N)λ, the phase difference between reference signal St and reception signal Sarx is theoretically 90 degrees. For the reference signal St, carrier-wave signal Sct supplied from the carrier-wave signal generation block 216 or modulation signal Sat before being converted by the BPSK modulation block 212 and transmitted from the input point 218 that are stored beforehand is used. If the phase difference is found not to be 90 degrees, the position rotational amount calculation block 270 calculates a phase rotational amount, to be more specific, a shift in the phase of reception signal Sarx with reference to the 90 degrees. Then, the position rotational amount calculation block 270 selects one of the antenna members 219a through 219d on the basis of the calculated shift and generates a switching signal in accordance with the selection, supplying the generated switching signal to the switch block 274.

On the basis of the switching signal supplied from the position rotational amount calculation block 270, the switch block 274 executes switching to one of the antenna members 219a through 219d that corresponds to the switching signal (refer to FIG. 6). This allows the phase difference between the input point 218 and the input point 219 in the calibration mode to be finely adjusted to (¼+N)λ, thereby, in the communication mode, setting the phase difference between modulation signal Sa of I-phase and modulation signal Sb of Q-phase to 90 degrees. As a result, the high-speed transmission can be realized by a precision IQ quadrature axis.

(4) Variation to the Second Embodiment

An exemplary high-frequency transmission system having a phase calibration function:

In this variation to the second embodiment, the antenna members 219a through 219d are calibrated by use of carrier-wave signal Sci for testing. It should be noted that, with reference to FIGS. 9A and 9B, the description of the configurations of the BPSK modulation blocks 212 and 213 will be skipped for the brevity of description.

Figure 9A:
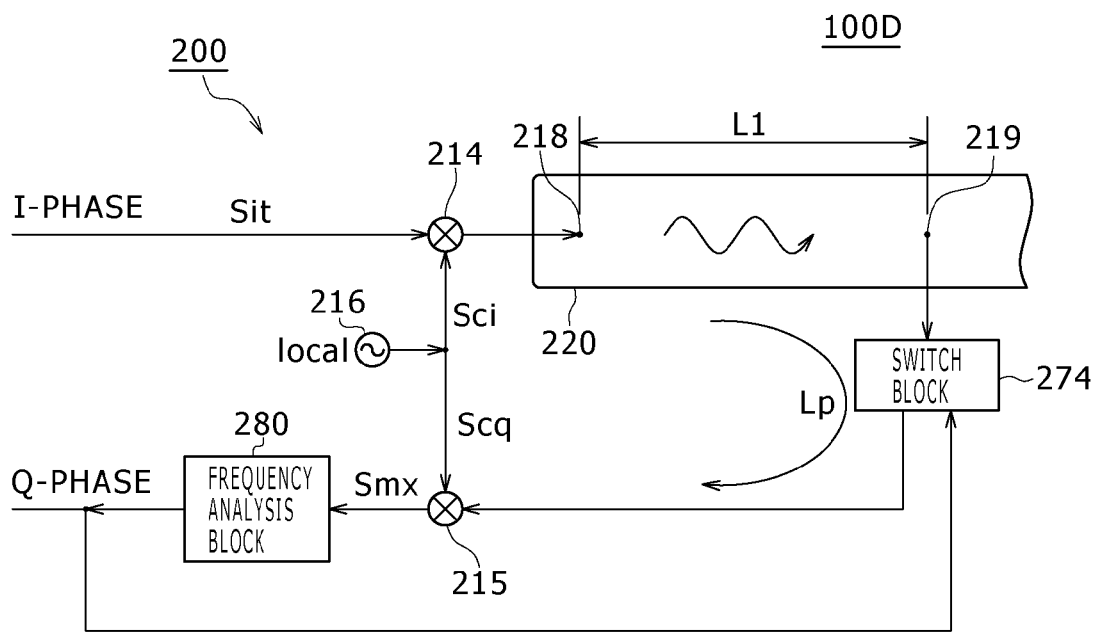
FIGS. 9A and 9B are diagrams illustrating an exemplary circuit configuration of a high-frequency transmission system having a calibration function associated with a variation to the second embodiment of the invention.
Figure 9B:
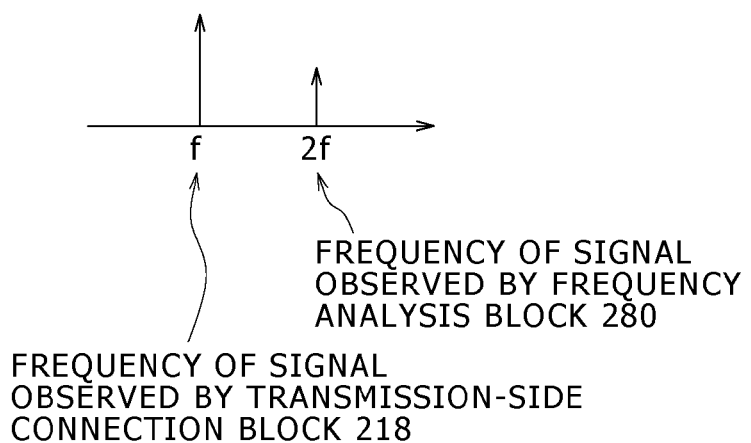

As shown in FIGS. 9A and 9B, a carrier-wave signal generation block 216 of a high-frequency transmission system 100D generates carrier-wave signal Sci for testing having a predetermined frequency. Carrier-wave signal Sci for testing generated by the carrier-wave signal generation block 216 is radiated from an antenna member 218a of an input point 218 into a waveguide 220.

An antenna member 219a of an input point 219 receives carrier-wave signal Sci for testing radiated from the antenna member 218a of the input point 218 and supplies the received signal to a mixer 215. It should be noted that, in what follows, the antenna members 219a through 219d will be generically referred to as an antenna member 219A (refer to FIG. 6). The carrier wave signal generation block 216 generates carrier-wave signal Scq for testing having a predetermined frequency and supplies the generated signal to the mixer 215. It should be noted that carrier-wave signal Sci for testing and carrier-wave signal Scq are supposed to be set to a same frequency. The mixer 215 multiplies carrier-wave signal Sci for testing by carrier-wave signal Scq and supplies resultant output signal Smx to a frequency analysis block 280.

The frequency analysis block 280 determines whether the frequency of output signal Smx outputted from the mixer 215 and observed by the frequency analysis block 280 is two times as high as carrier-frequency signals Sci and Scq for testing generated by the carrier wave signal generation block 216 (refer to FIG. 9B). This is because, if distance L1 between the input points 218 and 219 is ($\frac{1}{4}$+N)$\lambda$, namely, if a phase difference between carrier-wave signals Sci and Scq for testing is 90 degrees, a frequency component two times as high as carrier-wave signals Sci and Scq can be obtained by the multiplication by the mixer 215. It should be noted that the frequency analysis block 280 configures one example of a control block.

If the frequency of output signal Smx is found two times as high, the frequency analysis block 280 determines that distance L1 between the input points 218 and 219 is ($\frac{1}{4}$+N)$\lambda$ and maintains the current set antenna member 219a to 219d. On the other hand, if the frequency of output signal Smx is found to be not two times as high, the frequency analysis block 280 determines that distance between the input points 218 and 219 is not ($\frac{1}{4}$+N)$\lambda$ and switches a switch block 587 to any one of the input point 219a through 219d shown in FIG. 6. By repeating such an operation, the frequency analysis block 280 selects any one of the antenna members 219a through 219d that provides the a frequency component two times as high as carrier-wave signals Sci and Scq, setting distance L1 between the input points 218 and 219 to ($\frac{1}{4}$+N)$\lambda$. Consequently, the phase of modulation signal Sa transmitted from the antenna member 218a of the input point 219 and modulation signal Sb transmitted from the antenna member 219A of the input point 219 can be orthogonalized.

(5) The Third Embodiment

An exemplary high-frequency transmission system having an amplitude calibration function:

In the third embodiment, a technique is described that adjusts an amplitude value in addition to a phase difference between signals transmitted from the antenna members 218a and 219A of the input points 218 and 219 in the calibration mode. It should be noted that the operations to be executed until the transmission of a modulation signal from the input point 218 of the I-phase side are substantially the same as those of the second embodiment described above, so that the description of these operations will be skipped.

Figure 10:
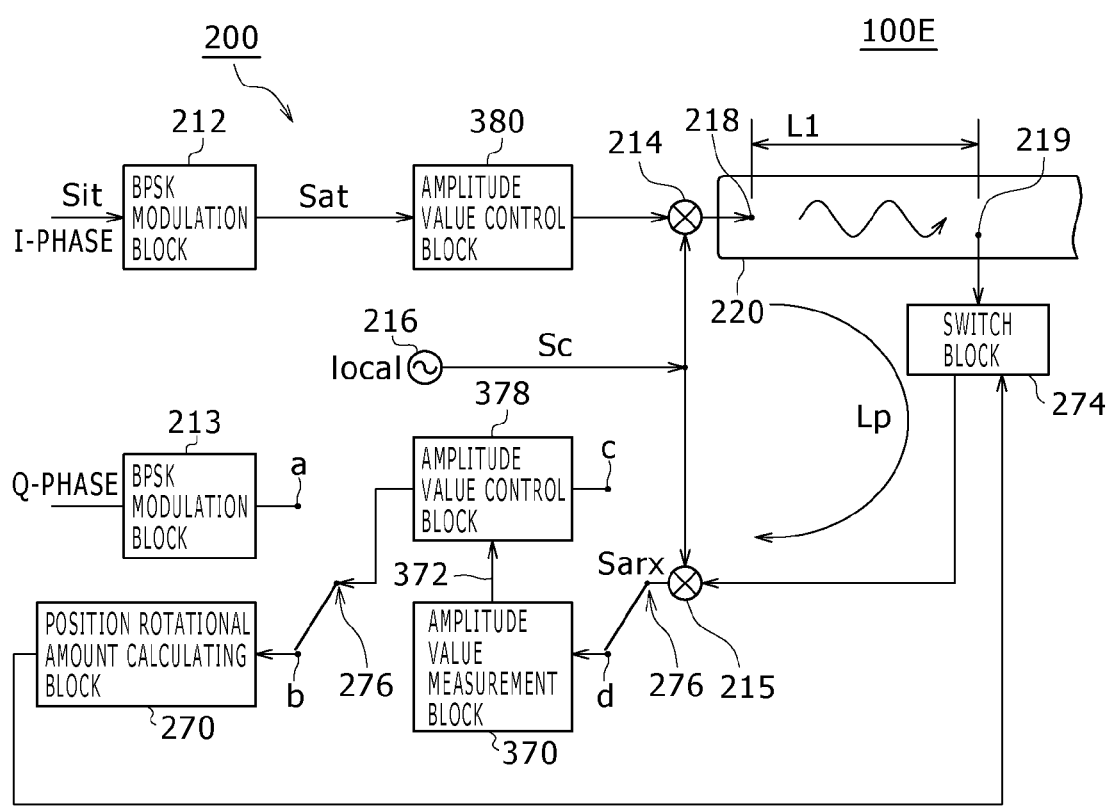
FIG. 10 is a diagram illustrating an exemplary configuration of a high-frequency transmission system having a calibration function practiced as a third embodiment of the invention.

As shown in FIG. 10, an antenna member 219A of an input point 219 of a high-frequency transmission system 100E functions also as an antenna member for receiving modulation signal Sat in the calibration mode, thereby receiving modulation signal Sat transmitted from an antenna member 218a of an input point 218. Modulation signal Sat received by the antenna member 218a is supplied to a mixer 215. Here, it is supposed that distance L1 between the input points 218 and 219 be set to ($\frac{1}{4}$+N)$\lambda$ as described above.

The mixer 215 multiplies modulation signal Sat received from the antenna member 219A of the input point 219 by carrier-wave signal Sc generated by a carrier wave signal generation block 216 to frequency-convert modulation signal Sat, thereby obtaining reception signal Sarx. Frequency-converted reception signal Sarx is supplied to an amplitude value measurement block 370 via a switch block 276 set to the terminal d side.

The amplitude value measurement block 370 measures an amplitude value of reception signal Sarx outputted from the mixer 215 to calculate a difference between amplitude values of measured reception signal Sarx, carrier-wave signal Sct supplied from the carrier wave signal generation block 216, and modulation signal Sat before attenuation stored in memory. Then, the amplitude value measurement block 370 generates a control signal based on this amplitude difference to supply the generated control signal to an amplitude value control block 378.

On the basis of the control signal from the amplitude value measurement block 370, the amplitude value control block 378 executes amplitude control such that an amplitude value of modulation signal Sat received at the antenna member 219A of the input point 219 matches an amplitude value of modulation signal Sat before attenuation and carrier-wave signal Sct. For example, if received modulation signal Sat has been attenuated, amplitude control is executed so as to raise the amplitude value thereof. Amplitude-controlled reception signal Sarx for testing is supplied to a position rotational amount calculation block 270 via the switch block 276 set to the terminal b side.

On the basis of reception signal Sarx for testing with the attenuation corrected by the waveguide 220, the position rotational amount calculation block 270 executes a phase calibration as described above, thereby selecting the optimum one of the antenna members 219a through 219d. It should be noted that an amplitude value control block 380 on the I-phase side and the amplitude value control block 378 on the Q-phase side are used also as amplifiers for amplifying modulation signals Sa and Sb in the normal communication mode.

As described above, in the present embodiment, measuring the amplitude value of reception signal Sarx for testing in the calibration mode allows the calculation of an attenuation ratio of the amplitude value of modulation signal Sat influenced by the waveguide 220 between the input points 218 and 219. Consequently, an error in the amplitude direction can be corrected for more correct phase calibration.

(6) The Fourth Embodiment

An exemplary high-frequency transmission system having a phase calibration function:

In the fourth embodiment, a phase calibration is executed by adjusting a phase difference between signals of I-phase and Q-phase by use of a dielectric material that varies dielectric constant by the application of electricity or optical energy rather than by the switching between the above-mentioned two or more antenna members 219a through 219d. In the following example, the use of a liquid crystal as a dielectric material having variable dielectric constant is described.

Figure 11A:
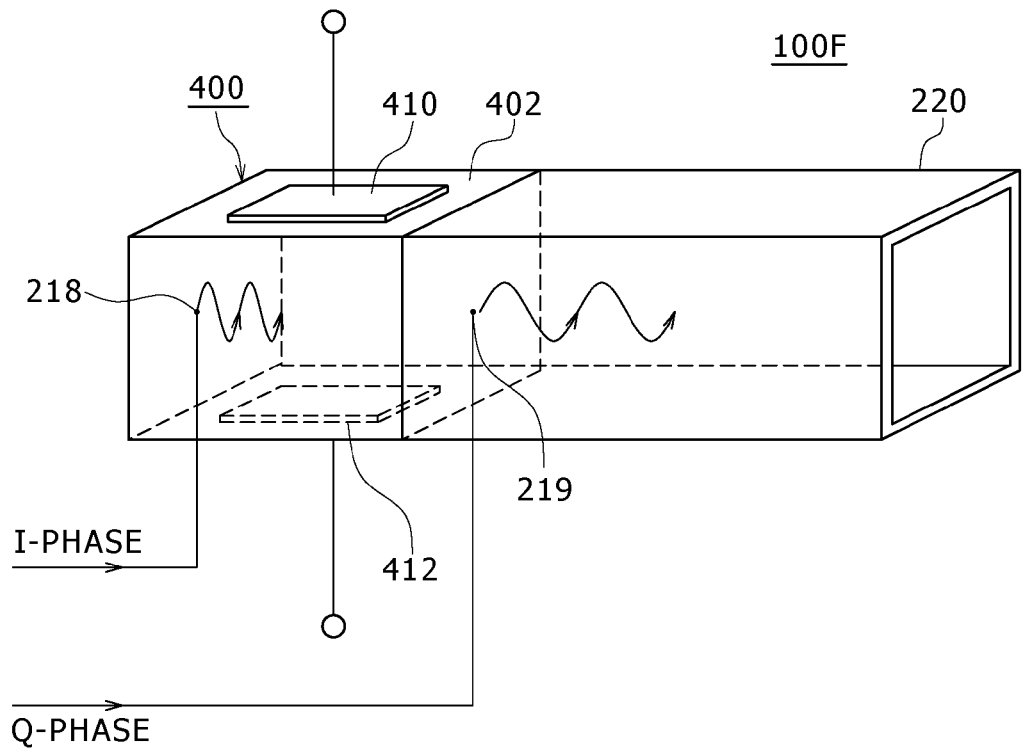
FIGS. 11A and 11B are diagrams illustrating an exemplary configuration of a phase control block of a high-frequency transmission system having a calibration function practiced as a fourth embodiment of the invention.
Figure 11B:
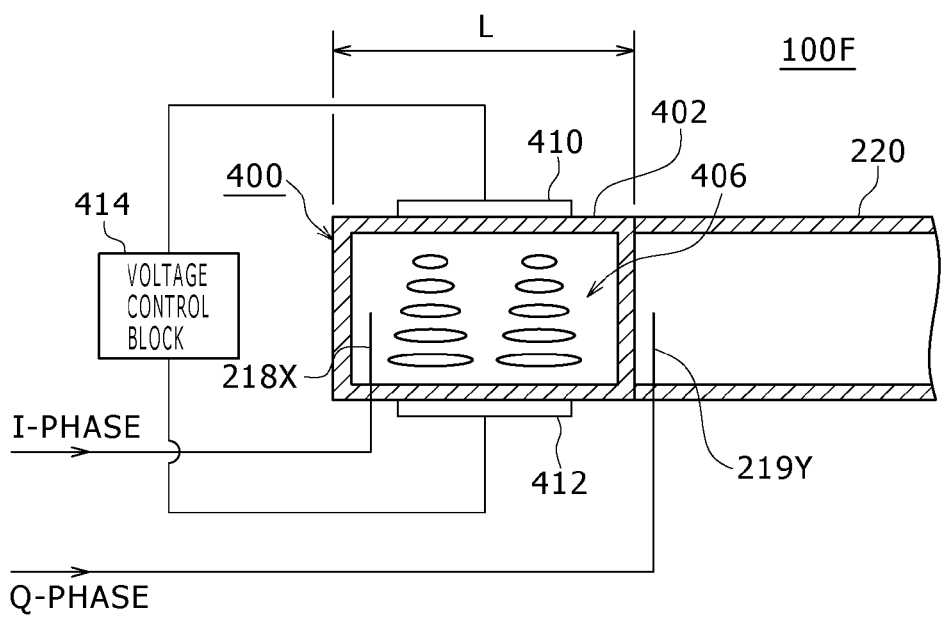

As shown in FIGS. 11A and 11B, a phase control block 400 is arranged at the transmission side end of a waveguide 220, phase control block 400 being configured to control a phase difference between two signals by adjusting distance L between input points 218 and 219. The phase control block 400 has a housing 402, a liquid crystal layer 406 encapsulated in the housing 402, electrodes 410 and 412 arranged on the upper surface and the lower surface, respectively, of the housing 402, and a voltage control block 414 for applying a predetermined voltage to the electrodes 410 and 412.

For the liquid crystal layer 406, a nematic liquid crystal for example is suitably used. It was clarified that specific inductive capacity ∈ of nematic liquid crystal is various from 3.0 to the 3.5 in accordance with an applied voltage also in a millimeter band such as 60 GHz. Hence, encapsulating this liquid crystal layer 406 in the waveguide 220 allows the fine adjustment of waveforms while a voltage is applied.

The voltage control block 414 is connected to the position rotational amount calculation block 270 shown in FIG. 8, and calculates an applied voltage on the basis of a rotational amount (or a shift) calculated by the position rotational amount calculation block 270, applying the calculated applied voltage to the electrodes 410 and 412. Consequently, the transmissivity of each signal that passes the liquid crystal layer 406 in accordance with an applied voltage value.

An antenna member 218X of the input point 218 is connected to a terminal block opposite to the waveguide 220 in the housing 402, thereby radiating modulation signal Sa into the waveguide 220 via the liquid crystal layer 406. An antenna member 219Y of the input point 219 is connected to a terminal block on the phase control block 400 side in the waveguide 220 outside the housing 402, thereby radiating modulation signal Sb into the waveguide 220. In this example, it is supposed that distance L between the input points 218X and 219Y is slightly shifted from (¼+N)λ.

In a high-frequency transmission system 100F configured as described above, a signal allocated to I-phase is radiated from the antenna member 218X of the input point 218 into the liquid crystal layer 406 given by specific inductive capacity ∈. In this example, the voltage control block 414 electrically controls an applied voltage to vary the dielectric constant of the liquid crystal layer 406, thereby varying the transmissivity of a signal that passes the liquid crystal layer 406. This configuration enables to set a phase difference between modulation signal Sa radiated from the antenna member 218X of the I-phase side and modulation signal Sb radiated from the antenna member 219Y on the Q side to 90 degrees, without depending on distance L between input points 218 and 219.

It should be noted that matters of which dielectric constants vary include matters using magnetic energy and optical energy and matters using thermal energy and mechanical energy in addition to the liquid crystal layer 406. Therefore it can be easily conceptualize for those skilled in the art to apply these matters to the systems embodied in the present invention. One example of varying dielectric constant by use of magnetic energy or optical energy is a matter configured by quantum paraelectrics (such as $SrTiO_3$, $CaTioO_3$, $KTaO_3$, for example) as disclosed in Japanese Patent Laid-open No. 2003-209266. One example of thermal energy is fluorinated ferroelectric polymer, for instance. In this case, the dielectric constant can be varied by varying the temperature of fluorinated dielectric constant by use of a heat sink. Further, one example of mechanical energy is lithium niobate, for instance. In this case, the dielectric constant can be varied by use of pressure application by fastening a fastening member, such as a screw, onto lithium niobate.

(7) The Fifth Embodiment

An exemplary high-frequency transmission system having a phase calibration function:

In the fifth embodiment, phase calibration is executed not by the switching between the above-mentioned two or more antenna members 219a through 219d, but by adjusting a phase difference between the signals of I-phase and Q-phase by use of a delay element.

Figure 12:
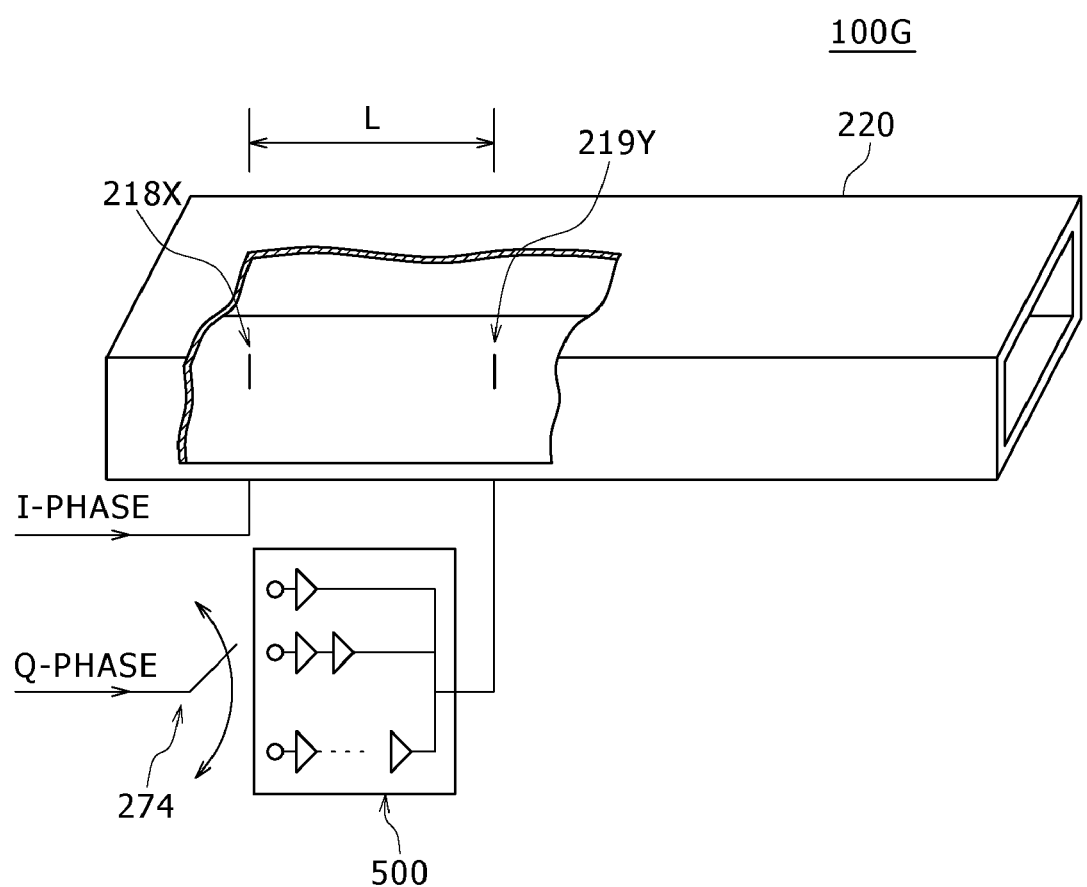
FIG. 12 is a view illustrating an exemplary configuration of a phase control block of a high-frequency transmission system having a calibration function practiced as a fifth embodiment of the invention.

As shown in FIG. 12, a phase control block 500, configured by a delay element group, such as buffers, is arranged between a switch block 274 and an input point 219. This phase control block 500, configured by two or more stages (n stages) for example, n delay elements interconnected in series being arranged on each stage in accordance with the number of stages. For example, on stage one, one delay element is arranged. On stage two, two delay elements are arranged as interconnected in series. On nth stage, n delay elements are arranged as interconnected in series. The delay element arranged on one end of each stage is electrically connected to the switch block 274 in accordance with the switching of switch block 274.

A high-frequency transmission system 100G thus configured, a position rotational amount calculation block 270 as shown in FIG. 8 selects a delay element such that a phase difference between signals becomes 90 degrees on the basis of modulation signal Sat for testing in the calibration mode, for example. Then, the position rotational amount calculation block 270 generates a switching signal corresponding to the selected delay element and supplies the generated switching signal to the switch block 274. On the basis of the switching signal supplied from the position rotational amount calculation block 270, the switch block 274 switches to an optimum delay element so that the phase difference between signals becomes 90 degrees.

As described above, according to the present embodiment, the phase control block 500 is arranged to delay the phase of modulation signal Sb of Q-phase through two or more stages. This configuration allows the precision adjustment of a phase difference between modulation signal Sa radiated from the antenna member 218X of the input point 218 on the I-phase side and modulation signal Sb radiated from the antenna member 219Y of the input point 219 of the Q-phase side, thereby realizing the high-speed transmission using IQ quadrature axis. It should be noted that the phase control block 500 may be arranged not on the Q-phase side but on the I-phase side or on both the I-phase and Q-phase sides.

(8) The Sixth Embodiment

An exemplary high-speed transmission system having a phase calibration function:

In the sixth embodiment, phase calibration is executed not by switching between the two or more antenna members 219a through 219d described above, but by adjusting a phase difference between the signals of I-phase and Q-phase by use of a phase shifter.

Figure 13:
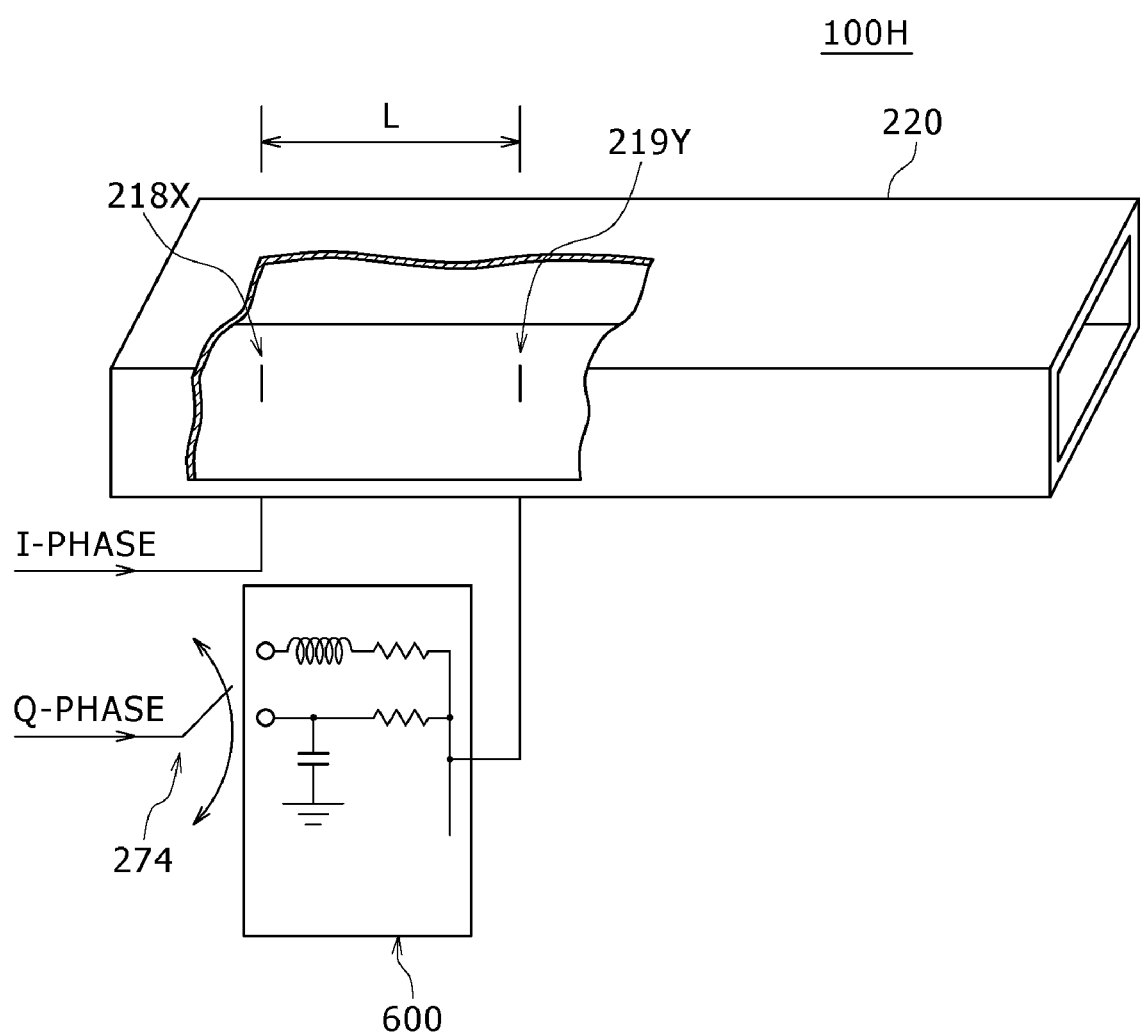
FIG. 13 is a view illustrating an exemplary configuration of a phase control block of a high-frequency transmission system having a calibration function practiced as a sixth embodiment of the invention.

As shown in FIG. 13, a phase control block 600, configured by a resistor (R), an inductor (L), and a capacitor (C), for example, is arranged between a switch block 274 and an input point 219. This phase control block 600 is configured by two or more stages (n stages). On each stage, n phase shifters interconnected in series or parallel in accordance with the number of stages are arranged. For example, on the first stage, an inductor and a resistor are arranged as interconnected in series. On the second stage, a capacitor and a resister are interconnected in parallel.

In a high-frequency transmission system 100H, a position rotational amount calculation block 270 shown in FIG. 8 selects a phase shifter such that a phase difference between the signals based on modulation signal Sat for testing becomes 90 degrees in the calibration mode. Then, the position rotational amount calculation block 270 generates a switching signal corresponding to the selected phase shifter and supplies the generated switching signal to a switch block 274. On the basis of the switching signal supplied from the position rotational amount calculation block 270, the switch block 274 switches to an optimum delay element so that the phase difference between the signals becomes 90 degrees.

As described above, according to the present embodiment, the arrangement of the phase control block 600 allows the delay of the phase of modulation signal Sb of Q-phase by two or more stages. This configuration allows the precision adjustment of the phase difference between modulation signal Sa radiated from an antenna member 218X on an input point 218 of the I-phase side and modulation signal Sb radiated from an antenna member 219Y of an input point 219 on the Q-phase side, thereby realizing the high-speed transmission by use of IQ quadrature axis. It should be noted that the phase control block 600 may be arranged on the I-phase side rather than the Q-phase side or on both the I-phase and Q-phase sides.

(9) The Seventh Embodiment

An exemplary high-frequency transmission system having a phase calibration function:

In the seventh embodiment, calibration is executed in cooperation between a transmission apparatus 200 and a reception apparatus 300. A high-frequency transmission system 100I associated with the embodiments of the present invention has the communication function of the high-frequency transmission system 100A and the reception apparatus 300 has a communication function in addition to the reception function. In what follows, the two or more antenna members 219a through 219d shown in FIG. 6 are referred to as No. 1 through No. 4, respectively.

Figure 14:
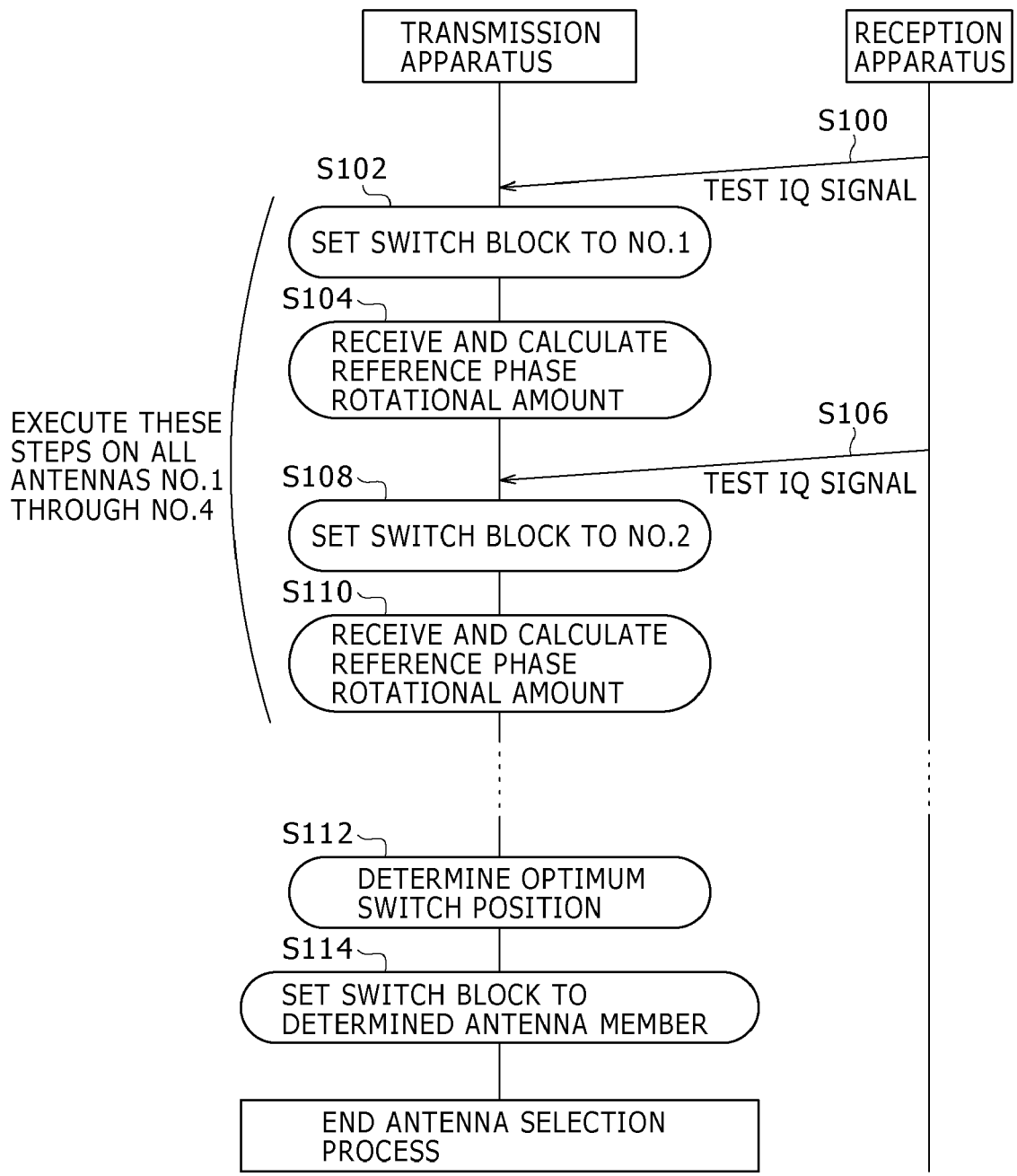
FIG. 14 is a flowchart indicative of an exemplary operation of a high-frequency transmission system having a calibration function practiced as a seventh embodiment of the invention.

As shown in FIG. 14, in step S100, when the high-frequency transmission system 100I is set to the calibration mode, the reception apparatus 300 transmits an IQ signal for testing from an antenna member of an output point 258 to the transmission apparatus 200 via a waveguide 220.

Next, in step S102, when the calibration mode is set, the transmission apparatus 200 sets a switch block 274 to an antenna member 219a (No. 1) of antenna members 219a through 219d.

In step S104, the antenna member 219a receives the IQ signal for testing transmitted from the reception apparatus 300 and supplies the received IQ signal to a position rotational amount calculation block 270. Also, the antenna member 218a receives the IQ signal for testing transmitted from the reception apparatus 300 and supplies the received IQ signal to a position rotational amount calculation block 270. The position rotational amount calculation block 270 obtains signal point information from the IQ signal for testing and stores this information in a memory block, not shown.

Having obtained the signal point information at the antenna member 219a, then, in step S106, the reception apparatus 300 transmits the IQ signal from the antenna member of the output point 258 to the transmission apparatus 200 again via the waveguide 220. Next, in step S108, the transmission apparatus 200 switches the switch block 274 from the antenna member 219a to the antenna member 219b.

In step S110, the antenna member 419b receives the IQ signal for testing transmitted from the reception apparatus 300 and supplies the received IQ signal to the position rotational amount calculation block 270. Also, the antenna member 218a receives the IQ signal for testing transmitted from the reception apparatus 300 and supplies the received IQ signal to the position rotational amount calculation block 270. The position rotational amount calculation block 270 obtains signal point information from each of the IQ signals for testing and stores the obtained signal point information in a memory block, not shown.

The above-mentioned calibration operation is executed also on the antenna members 219c and 219d and the signal point information in the IQ signals for testing received at the antenna members 219c and 219d is obtained and stored in the memory block.

In step S112, on the basis of the signal point information in the IQ signals for testing of the antenna members 219a through 219d stored in the memory block, the position rotational amount calculation block 270 determines the antenna members 219a through 219d such that a phase difference between modulation signals Sa and Sb becomes 90 degrees. Then, the position rotational amount calculation block 270 generates a switching signal corresponding to the determined one of the antenna members 219a through 219d and supplies the generated switching signal to the switch block 274.

In step S114, on the basis of the switching signal supplied from the position rotational amount calculation block 270, the position rotational amount calculation block 270 switches to an optimum one of the antenna members 219a through 219d that makes the phase difference between modulation signals Sa and Sb be 90 degrees. The above-mentioned sequence of calibration operations can adjust the phase difference between modulation signals Sa and Sb with precision, thereby realizing the high-speed transmission using IQ quadrature axis. It should be noted that it is easily conceptualized by those skilled in the art that the above-mentioned precision adjustment can be realized by use of error bit information (or an error correction signal) added to each IQ signal, for example, in addition to the signal point information described above.

(10) The Eighth Embodiment

Figure 15:
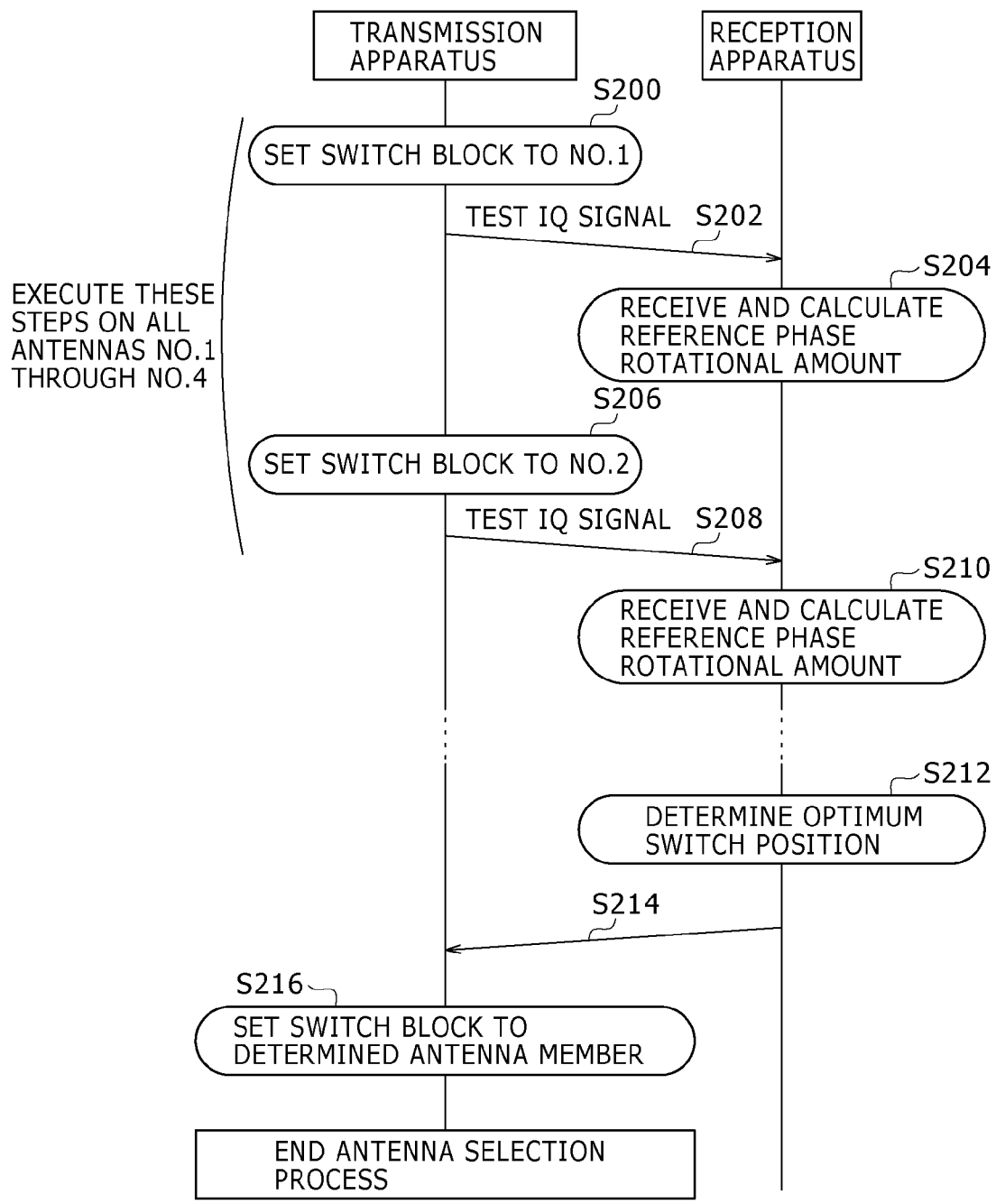
FIG. 15 is a flowchart indicative of an exemplary operation of a high-frequency transmission system having a calibration function practiced as an eighth embodiment of the invention.
Figures 16, 17:
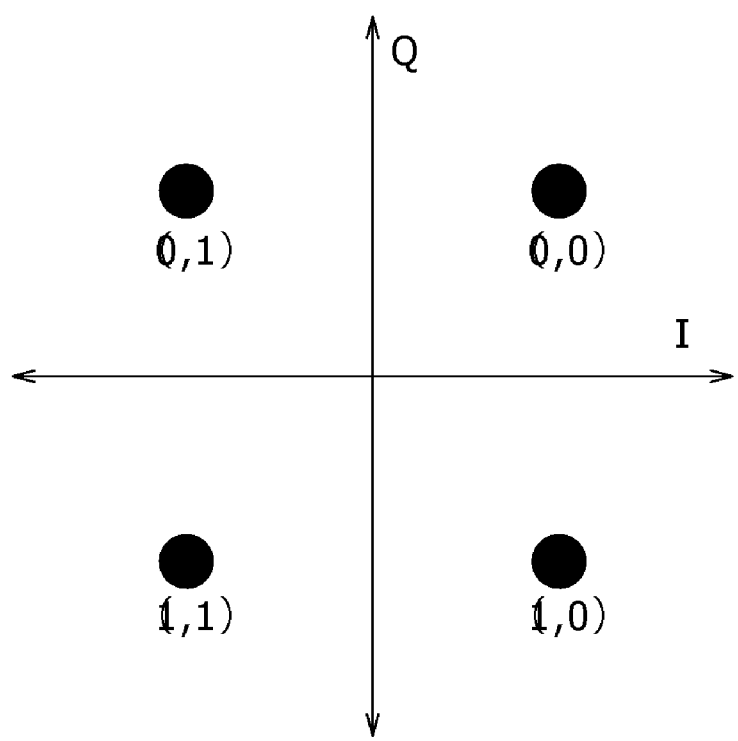
FIG. 16 is a diagram for explaining QPSK modulation (1)
FIG. 17 is a diagram for explaining QPSK modulation (2).

An exemplary high-frequency transmission system having a phase calibration function:

As with the seventh embodiment described above, the eighth embodiment executes calibration in cooperation between a transmission apparatus 200 and a reception apparatus 300. As shown in FIG. 15, in step S200, the transmission apparatus 200 of a high-frequency transmission system 100J sets a switch block 274 to an antenna member 219a (No. 1) of antenna members 219a through 219d. Then, in step S202, the transmission apparatus 200 transmits an IQ signal for testing from each of the antenna members 218a and 219a to the reception apparatus 300 via a waveguide 220.

In step S204, the reception apparatus 300 receives each IQ signal for testing via an antenna member of an output point 258 shown in FIG. 3. The reception apparatus 300 has a position rotational amount calculation block 270 as shown in FIG. 8. The position rotational amount calculation block 270 obtains signal point information (or a phase rotational amount of the IQ signal) from each IQ signal for testing and stores the obtained signal point information in a memory block, not shown.

Next, in step S206, the transmission apparatus 200 switches the switch block 274 from the antenna member 219a (No. 1) to the antenna member 219b (No. 2). Then, in step S208, the IQ signal for testing is transmitted from each of the antenna members 218a and 219a to the reception apparatus 300 via waveguide 220.

In step S210, the reception apparatus 300 receives each IQ signal for testing via the antenna member of the output point 258. The position rotational amount calculation block 270 obtains the signal point information (or a phase rotational amount of the IQ signal) from each IQ signal for testing and stores the obtained signal point information in the memory block, not shown.

The above-mentioned calibration operation is executed on each of the antenna members 219c and 219d to obtain the signal point information in the received IQ signal for testing of each of the antenna members 219c and 219d and the obtained signal point information is stored in the memory block.

Then, in step S212, on the basis of the signal point information in the IQ signal for testing of each of the antenna members 219a through 219d stored in the memory block, the reception apparatus 300 determines one of the antenna members 219a through 219d that makes the phase difference between modulation signals Sa and Sb be 90 degrees.

In step S214, upon determination of an optimum one of the antenna members 219a through 219d, the reception apparatus 300 feeds back a switching signal based on one of the antenna members 219a through 219d determined by the position rotational amount calculation block 270 to the transmission apparatus 200. The transmission apparatus 200 receives the switching signal via the antenna member 218a of the input point 218 and any one of the antenna members 219a through 219d of the input point 219.

In step S216, on the basis of the switching signal supplied from the reception apparatus 300, the transmission apparatus 200 switches to an optimum one of the antenna members 219a through 219d that makes the phase difference between modulation signals Sa and Sb be 90 degrees. The above-mentioned sequence of calibration operations allows the precision adjustment of the phase difference between modulation signals Sa and Sb, thereby realizing the high-speed transmission by use of IQ quadrature axis.

While preferred embodiments of the present invention have been described using specific terms, such description is for illustrative purpose, and it is to be understood that changes and variations may be made without departing from the spirit or scope of the following claims.

For example, in the embodiments described above, BPSK modulation has been described. However, the embodiments are not limited to this modulation scheme. QPSK (4-phase PSK) modulation and 8-phase PSK modulation, for example, are also applicable to the embodiments of the invention. Further, it is apparent for those skilled in the art that the addition of amplitude control devices before and after the BPSK modulation blocks 212 and 213 described above makes it applicable to the QAM scheme in which digital codes are superimposed also in amplitude direction. According to QAM transmission, the orthogonality of IQ axis greatly influences the transmission properties, so that, by making the most of the features of the present high-frequency transmission system, the IQ quadrature-axis transmission with high precision can be executed.

The present application contains subject matter related to that disclosed in Japanese Priority Patent Application JP 2009-093444 filed in the Japan Patent Office on Apr. 7, 2009, the entire content of which is hereby incorporated by reference.

What is claimed is:

1. A transmission apparatus comprising:
a first transmission block configured to modulate a carrier-wave signal having a predetermined frequency on the basis of a first input signal, thereby outputting a first transmission signal; and
a second transmission block configured to modulate a carrier-wave signal having a predetermined frequency on the basis of a second input signal, thereby outputting a second transmission signal;
wherein a first input point for inputting said first transmission signal outputted from said first transmission block into a waveguide and a second input point for inputting said second transmission signal outputted from said second transmission block into said waveguide are shifted by a distance for providing a predetermined phase difference between said first transmission signal and said second transmission signal.

2. The transmission apparatus according to claim 1, wherein, let N be an integer and $\lambda$ be a wavelength of said carrier-wave signal, then said first input point and said second input point are shifted from each other by $(1/4+N)\lambda$ wavelength.

3. The transmission apparatus according to claim 2, wherein said first transmission signal and said second transmission signal outputted from said first transmission block and said second transmission block, respectively, are millimeter band signals.

4. The transmission apparatus according to claim 3, wherein a dielectric material is used having a predetermined permittivity for said waveguide.

5. The transmission apparatus according to claim 1, wherein said first input point and said second input point each have any one of a dipole antenna and a slit antenna for transmitting said first transmission signal and said second transmission signal.

6. The transmission apparatus according to claim 1, wherein said second input point has a plurality of antennas for receiving said first transmission signal, said transmission apparatus further comprising
a control block configured to make a comparison between a phase of said carrier-wave signal and a phase of said first transmission signal transmitted from said first input point and received by said second input point and, on the basis of a shift in the phase of said first transmission signal calculated by a result of said comparison, select any one of said plurality of antennas.

7. The transmission apparatus according to claim 6, wherein
said first transmission block has a first amplification block for amplifying said first signal, and
said second transmission block has a second amplification block for amplifying said second signal,
said transmission apparatus further comprising
an amplitude value measurement block configured to measure an amplitude value of said first transmission signal transmitted from said first input point and received by said second input point, thereby adjusting, on the basis of a result of said measurement, an amplitude value of said second signal outputted from said second amplification block.

8. The transmission apparatus according to claim 1, further comprising:
a control block configured to make a comparison between a phase of said carrier-wave signal and a phase of said first transmission signal transmitted from said first input point and received by said second input point and, on the basis of a result of said comparison, calculate a shift in the phase of said first transmission signal; and
a phase adjustment block configured to adjust a phase of at least one of said first transmission signal and said second transmission signal on the basis of said shift calculated by said control block.

9. The transmission apparatus according to claim 8, wherein said phase adjustment block is arranged at one end of said waveguide and configured by a matter of which permittivity varies by any of electrical, optical, magnetic, and thermal energies.

10. The transmission apparatus according to claim 8, wherein said phase adjustment block is arranged outside said waveguide and configured by at least one of delay element, a resistor, an inductor, and a capacitor.

11. The transmission apparatus according to claim 1, wherein the signal processing is phase modulation for modulating phases of said first signal and said second signal and, in addition to the phase modulation, amplitude modulation of said first signal and said second signal is executed.

12. A communication system comprising:
a transmission apparatus having
   a first transmission block configured to modulate a carrier-wave signal having a predetermined frequency on the basis of a first input signal, thereby outputting a first transmission signal, and
   a second transmission block configured to modulate a carrier-wave signal having a predetermined frequency on the basis of a second input signal, thereby outputting a second transmission signal;
a waveguide in which said first transmission signal outputted from said first transmission block and said second transmission signal outputted from said second transmission block are inputted; and
a reception apparatus configured to receive said first transmission signal and said second transmission signal transmitted via said waveguide and demodulate the received first transmission signal and the received second transmission signal to obtain reception signals on the basis of a carrier-wave signal having a predetermined frequency;
wherein a first input point for inputting said first transmission signal outputted from said first transmission block into a waveguide and a second input point for inputting said second transmission signal outputted from said second transmission block into said waveguide are shifted by a distance for providing a predetermined phase difference between said first transmission signal and said second transmission signal.

13. The communication system according to claim 12 wherein
said transmission apparatus transmits said first transmission signal and said second transmission signal outputted from said first transmission block and said second transmission block to said reception apparatus via said waveguide and
said reception apparatus receives said first transmission signal and said second transmission signal transmitted from said transmission apparatus and determines on the basis of the received first transmission signal and the received second transmission signal whether there is said predetermined phase shift between said first input point and said second input point, thereby feeding back a result of said determination to said transmission apparatus.

14. The communication system according to claim 12, wherein
said reception apparatus transmits said first transmission signal and said second transmission signal to said transmission apparatus via said waveguide and
said transmission apparatus receives said first transmission signal and said second transmission signal transmitted from said reception apparatus and determines on the basis of the received first transmission signal and the received second transmission signal whether there is said predetermined phase shift between said first input point and said second input point.

15. A transmission apparatus comprising:
first transmission means for modulating a carrier-wave signal having a predetermined frequency on the basis of a first input signal, thereby outputting a first transmission signal; and
second transmission means for modulating a carrier-wave signal having a predetermined frequency on the basis of a second input signal, thereby outputting a second transmission signal;
wherein a first input point for inputting said first transmission signal outputted from said first transmission means into a waveguide and a second input point for inputting said second transmission signal outputted from said second transmission means into said waveguide are shifted by a distance for providing a predetermined phase difference between said first transmission signal and said second transmission signal.

* * * * *